United States Patent [19]
Welker

[11] Patent Number: 5,213,586
[45] Date of Patent: May 25, 1993

[54] VENT CHECK VALVE

[75] Inventor: Brian H. Welker, Sugar Land, Tex.

[73] Assignee: Welker Engineering Company, Sugar Land, Tex.

[21] Appl. No.: 937,585

[22] Filed: Aug. 28, 1992

[51] Int. Cl.$^5$ .......................... C10J 1/28; F04B 21/02
[52] U.S. Cl. ...................................... 48/195; 137/202; 417/401
[58] Field of Search ................ 137/202; 417/401, 435; 48/195, 127.9

[56]  References Cited

U.S. PATENT DOCUMENTS

| | | | |
|---|---|---|---|
| 2,166,370 | 7/1938 | Putnam et al. | 137/68 |
| 2,175,526 | 10/1938 | Hutchison et al. | 261/121 |
| 2,677,939 | 5/1954 | Clute | 137/202 X |
| 2,780,071 | 2/1957 | Calva | 62/1 |
| 2,935,990 | 5/1960 | Biddle | 137/202 |
| 3,112,189 | 11/1963 | Elliott | 48/195 |
| 3,169,839 | 2/1965 | Calva | 48/195 |
| 4,007,755 | 2/1977 | Lerner et al. | 137/101.21 |
| 4,025,315 | 5/1977 | Mazelli | 44/52 |
| 4,504,281 | 3/1985 | Williams, Jr. et al. | 48/195 |
| 4,611,294 | 9/1986 | Stanfill | 364/173 |

OTHER PUBLICATIONS

Advertising Brochure, "Nomad Chemical Metering Pump", Welker Engineering Company, Sep. 1988.
Advertising Brochure, "Porex Pneumatic Mufflers", Porex Technologies Corp., Circa 1984.
Advertising Brochure, "Sintercon", Advance Filtration Limited.

Primary Examiner—Richard E. Gluck
Attorney, Agent, or Firm—Herzog, Crebs & McGhee

[57]  ABSTRACT

A vent check valve for use with a fluid pump such as a chemical pump wherein the vent check valve includes a floatation chamber and floatation member therein such that air is allowed to flow therethrough during normal operation of the pump while the liquid is prevented from flowing therethrough in the event of a malfunction of the pump. The vent check valve also includes a porous member thereon which allows air to flow therethrough while preventing direct access into and contamination of the vent check valve.

18 Claims, 5 Drawing Sheets

VENT CHECK VALVE

BACKGROUND OF THE INVENTION

1. Field of the Invention

The present invention relates to a vent check valve assembly and more particularly to a device which is mounted on the vent outlet of a pump or sampler to prevent the overflow of the pumped or sampled fluid. One such use of the present invention is in the field of odorant injection systems wherein an odorant is injected into a natural gas pipeline and the vent check valve assembly is used to prevent the loss of odorant if the odorant pump fails.

2. Description of Related Art

A preferred use of the present invention is in the area of injecting liquid chemicals into a gas. For example, natural gas is generally odorless until an odorant such as ethyl mercaptan (ethanethiol) is injected into the gas as it flows through a pipeline. Currently available odorant injection systems include a storage container for the odorant, a chemical pump and an injection nozzle. These systems also include various level and flow sight glasses as well as filters and check valves between the storage container, pump and the injection nozzle.

The odorant injection systems are typically located at remote metering stations or gas distribution stations or substations so that gas leaks may be detected in cities or other populated areas. Therefore, the natural gas in larger pipelines is usually odorless while residential or commercial gas lines include an odorant dispersed in the gas. Because of the combustibility of the odorant and the gas, the odorant injection system is oftentimes exposed to the elements or housed in a small building at a distribution center which may or may not be monitored.

A number of patents have been granted for various odorant injection systems. For example, U.S. Pat. No. 2,175,526 was granted to Hutchinson, et al. In the Hutchinson, et al. patent, a portion of the gas flowing through the pipeline is diverted into the odorant injection system to be mixed with the odorant and then subsequently returned to the pipeline. U.S. Pat. No. 2,166,370 granted to Putnam, et al. discloses another odorant injection system. The Putnam, et al. patent discloses the use of a pressure sensor in the pipeline which is connected to a lever which controls the flow of the odorant into the pipeline. U.S. Pat. Nos. 3,112,189; 4,007,755; 4,025,315 and 4,611,294 disclose further systems and methods for injecting an odorant into a pipeline.

The chemical pumps used in many currently available odorant injection systems typically include odorant inlet and outlet openings as well as a vent opening. The vent opening is located below the piston of the pump and in flow communication with the piston chamber of the pump to prevent the buildup of a back pressure in the pump. In the current pumps, this vent opening is open to the atmosphere. Because these pumps are not infallible and because maintenance on these pumps may not be performed on a regular basis, the seals on the pumps may occasionally fail. If this occurs, the pump will continue to operate and the odorant will be pumped out of the vent outlet rather than through the odorant outlet. This occurs because the odorant will normally take the path of least resistance through the vent outlet rather than past a poppet valve which is positioned adjacent to the odorant outlet. If the odorant is spilled, the company will be required to clean up the spill and may also face various fines from regulatory agencies such as the Environmental Protection Agency. Additionally, with the unprotected vent outlet, it is possible for various insects such as bees or wasps to plug or otherwise obstruct or introduce contaminants into the vent outlet, thereby decreasing the efficiency and expected life of the pump by increasing the pressure necessary to move the piston in the piston chamber of the pump.

The present invention overcomes the disadvantages of the currently available odorant injection systems by providing a vent check valve which attaches to and covers the vent outlet of the chemical pump while allowing the flow of air therethrough during normal operation of the chemical pump. Additionally, the present invention prevents accidental flow of odorant from the odorant injection system in the event that the seals in the chemical pump fail.

SUMMARY OF THE INVENTION

It is an object of the present invention to provide an odorant injection system which will operate efficiently and reliably.

It is a further object of the present invention to provide an odorant injection system which will prevent the loss of odorant from the chemical pump if the chemical pump malfunctions.

It is yet another object of the present invention to provide a versatile vented check valve which maybe used with a variety of pumps.

It is yet another object of the present invention to provide a vented check valve which allows a pump to be vented during normal use while preventing the loss of a fluid therethrough in the event of a system failure.

The present invention is generally directed to a valve assembly which allows the free flow of an air or gas therethrough during normal use and which will prevent the flow of fluid therefrom in the event of a system failure. The valve assembly of the present invention is preferably a vent check valve which includes an inlet opening and an outlet opening with a floatation member positioned therebetween. The outlet opening is preferably covered with a porous member which prevents access to the outlet opening while allowing air or other gases to flow therethrough. The floatation member is positioned in a chamber which is shaped to allow air or other gases to flow therethrough during normal use and which includes a sealing area with an 0-ring or similar member thereon to provide a sealing surface for the floatation member when a fluid is received in the vent check valve. A preferred form of the present invention also includes a pressure gauge in flow communication with the chamber of the vent check valve to allow for the visual observation of the pressure in the vented check valve.

As described more fully below, the vent check valve is preferably used as part of an odorant injection system which broadly includes a storage container for the odorant, a chemical pump and an injection apparatus for injecting the odorant into the pipeline. A preferred odorant injection system includes a storage container which is in fluid communication with the chemical pump and has a shut-off valve and level sight glass for visual observation of the level of the odorant in the storage container positioned between the storage container and the chemical pump. Additionally, a chemical filter may be positioned in line between the storage container and the chemical pump to filter the odorant prior to the introduction of the odorant into the chemical pump. The chemical pump is preferably connected in flow communication with an injection assembly having an injection nozzle positioned in the pipeline. A check valve and a flow sight glass for the visual observation of the flow of odorant therethrough are preferably positioned in line between the chemical pump and the injection nozzle. Additionally, a pressure gauge may be positioned between the chemical pump and the injection nozzle to allow for the visual observation of the odorant pressure immediately prior to injection of the odorant into the pipeline.

An advantage of the present invention is that it is adaptable for use on a variety of pumps to reliably prevent the loss of an odorant or other fluid therefrom in the event that the pump malfunctions.

BRIEF DESCRIPTION OF THE DRAWINGS

So that the manner in which the above-recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is directed to a valve assembly or vent check valve 10 which is preferably used with an odorant injection system generally referred to herein as odorant injection system 12. Although as described herein, the vent check valve 10 is preferably used with an odorant injection system 12 as shown in FIG. 1, the vent check valve may be used with nearly any pump such as the chemical pump which is described in more detail below.

Figure 1:
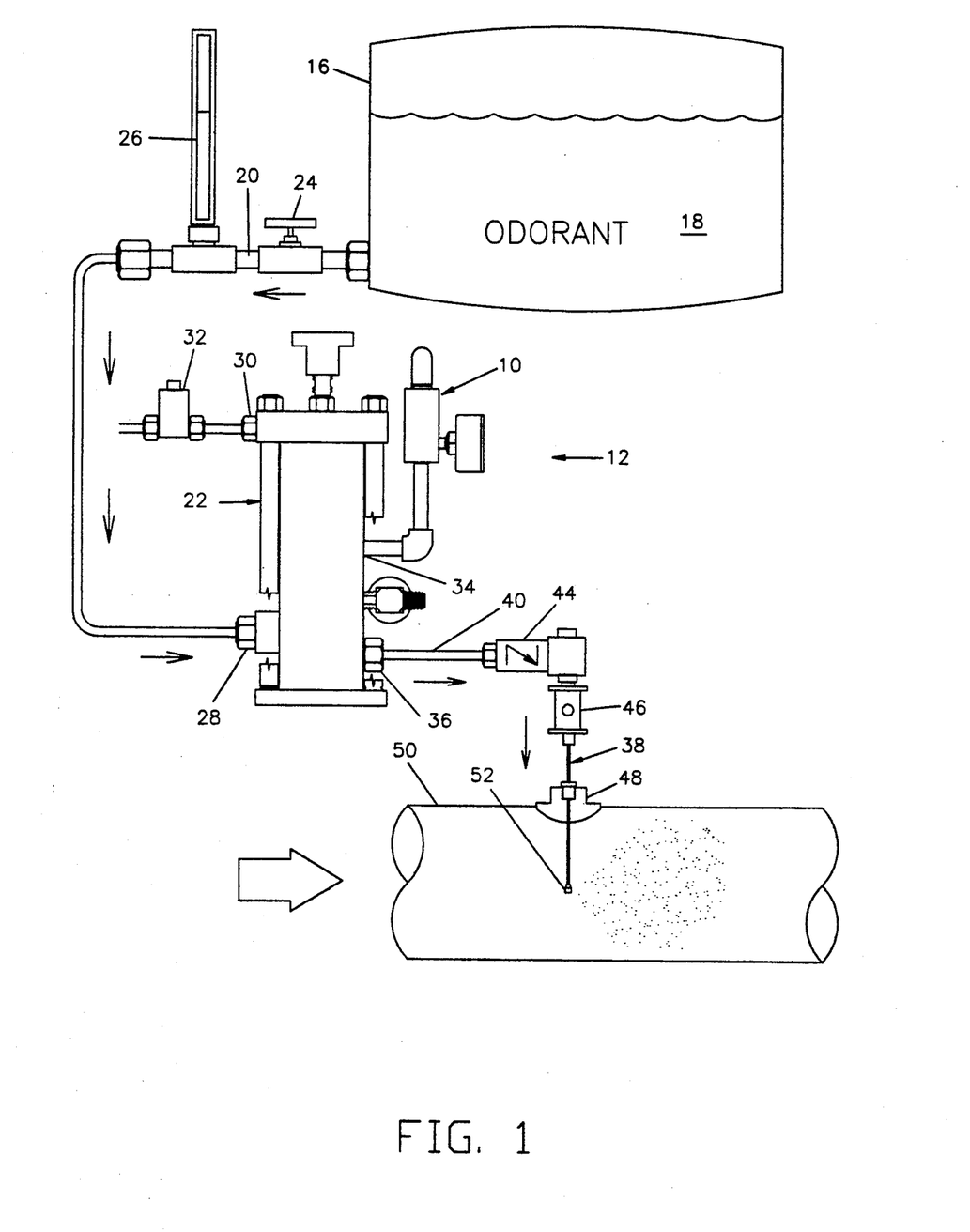
FIG. 1 is a diagrammatic view of the odorant injection system of the present invention.

Referring now to FIG. 1, the odorant injection system 12 preferably includes an odorant storage container 16 having a fluid or odorant 18 such as ethyl mercaptan therein. The storage container 16 is connected in flow communication via a pipe 20 or other rigid tubing to a chemical pump 22. The chemical pump 22 shown in FIG. 2 typically operates with input pressure between 700 and 1,000 psi. As shown in FIG. 1, a shut-off valve 24 and a level sight indicator 26 are positioned along the pipe 18 between the storage container 16 and the chemical pump 24. The level sight indicator 26 allows the user to visually determine the amount of odorant 18 in the storage container 16 while the shut-off valve 24 allows the user to discontinue the flow of odorant 18 from the storage container 16. Additionally, a chemical filter (not shown) may be located between the level sight indicator 26 and the chemical pump 22 to filter the odorant 18 prior to the entry of the odorant 18 into the chemical pump 22.

The chemical pump 22 includes a variety of inlets and outlets thereon which are described in more detail below. In particular, the chemical pump 22 includes an odorant inlet 28 which receives the odorant 18 from the storage container 16 through the pipe 20. The other inlet is a pressure inlet 30 which supplies the pressure necessary to operate the chemical pump 22 and is connected to a timer 32 and other components such as a regulator (not shown), relief valve (not shown) and a supply filter (not shown).

The outlets of the chemical pump 22 include a vent outlet 34 which is connected to the vent check valve 10 and the odorant outlet 36. The odorant outlet 36 is connected to the injection nozzle assembly 38 via a pipe 40 which includes a check valve 42 and a flow sight glass 44 therein. Additionally, the pipe 40 may include a pressure gauge (not shown) thereon to allow the user to visually observe the flow pressure of the odorant 18 through the pipe 40. As shown in FIG. 1, the injection nozzle assembly 38 includes a threaded connector 46 which attaches to an adaptor 48 on the pipeline 50 to fixedly retain the injection nozzle 52 in the desired position in the pipeline 50.

Figure 2:
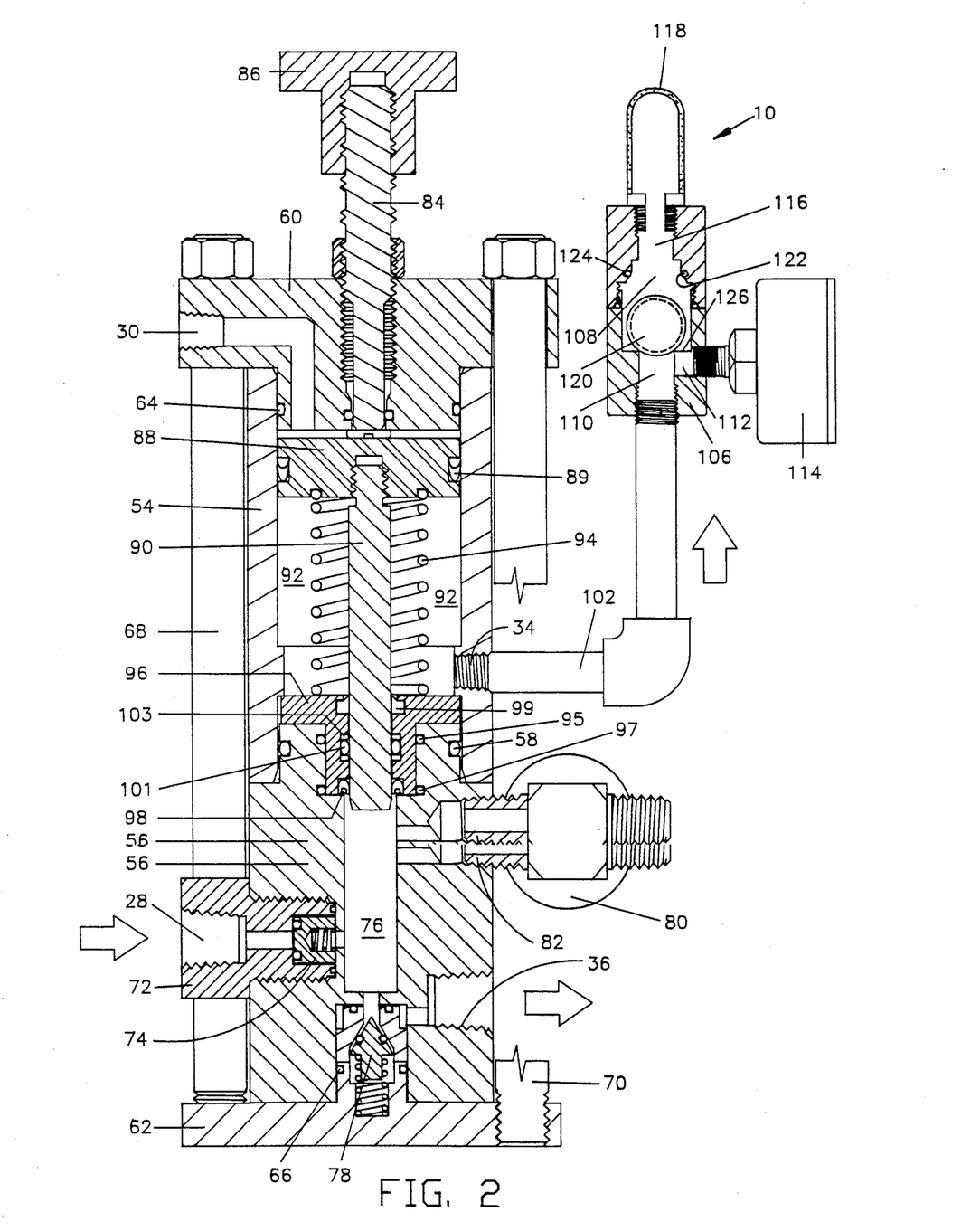
FIG. 2 is a cross-sectional view of the chemical pump and vent check valve of the present invention.

As shown best in FIG. 2, the chemical pump 22 includes a top cylinder portion 54 and a bottom body portion 56. The top cylinder portion 54 and the bottom body portion 56 are fitted together with an O-ring 58 and are sealed with a top end cap 60 and a bottom base cap 62, both of which are secured thereon with further O-rings 64 and 66. As shown in FIG. 2, the cylinder portion 54, body portion 56, end cap 60 and base cap 62 are all secured together by a pair of threaded tie bolts 68 and 70 which extend between the end cap 60 and base cap 62.

The body portion 56 of the chemical pump 22 includes the odorant inlet 28 which is formed by a threaded inlet cap 72 thereon which allows odorant 18 to enter therethrough and past an inlet poppet 74 which is actuated to open in response to reduced pressure levels in the fluid chamber 76 of the chemical pump 22. The fluid chamber 76 is substantially formed by a cylindrically shaped opening in the body portion 56. The odorant outlet 36 is similarly threaded and includes a relief poppet 78 on the base cap 62 which is in flow communication with the fluid chamber 76 and opens in response to increased pressures in the fluid chamber 76. Additionally, as shown best in FIG. 1, a pressure gauge 80 is in flow communication with the pump chamber 76 through side opening 82 to allow for the visual observation of the pressure in the fluid chamber 76.

The cylinder portion 54 and end cap 60 generally form the top portion of the chemical pump 22 which includes the piston chamber 92 therein. As shown in FIG. 2, the end cap 60 includes an adjustment screw 84 having a knob 86 thereon. The adjustment screw 84 extends through the end cap 60 to a location adjacent to the top of a cylindrical piston member 88. The piston member 88 includes a U-shaped cup member 89 on the exterior thereof to form a seal with the interior of the cylinder portion 54 to form part of the piston chamber 92. Additionally, the pressure inlet 30 includes a threaded portion on the end cap 60 and extends downwardly to a location adjacent to the top of the piston member 88. The piston member 88 includes a shaft member 90 extending from the bottom of the piston member 88 through the piston chamber 92 and into the fluid chamber 76. An elongate spiral spring 94 extends between the piston member 88 and a wiper member 96 on the bottom of the piston chamber to bias the piston member 88 towards end cap 60 and pressure inlet 30. The vent outlet 34 extends into the side of the piston chamber 92 to provide communication between the piston chamber 92 and the vent check valve 10.

As shown best in FIG. 2, the piston chamber 92 is sealed from communication with the fluid chamber 76 by the wiper cap 96 and a pair of O-rings 95 and 97. A wiper ring 99, O-ring 101, spiral back-up ring 103 and U-cup 98 form seals between the interior of the wiper cap 96 and the exterior of the shaft member 90 to prevent communication between the piston chamber 92 and the fluid chamber 76. Therefore, there are preferably two seals formed by the O-rings 95 and 97 between the exterior of the wiper cap 96 and the body portion 56 of the chemical pump and further seals formed by the 0-ring 101 and the U-cup 98 between the interior of the wiper cap 96 and the exterior of the shaft member 90. Because the O-rings, 95, 97 and 101, and the U-cup 98 are preferably formed of an elastomeric material, they may fail if they are not properly maintained or replaced after an extended period of use. If the seals between the shaft member 90 and the wiper cap 96 and the body portion 56 of the chemical pump 22 fail, the upstroke of the piston member 88 and shaft member 90 will draw odorant 18 into the fluid chamber 76 from the odorant inlet 28 as usual, but the downstroke of the piston member 88 and shaft member 90 will cause odorant 18 to flow upwardly from the fluid chamber 76, into the piston chamber 92 and out of the vent outlet 34 instead of past the relief poppet 78 and through the odorant outlet 36 as during normal operation of the chemical pump 22. The flow of odorant 18 through the vent outlet 34 occurs because it takes less pressure for the odorant 18 to flow through the vent outlet 34 than it does for the odorant 18 to flow past the relief poppet 78 and into the odorant outlet 36.

As shown best in FIGS. 2-5, the vent check valve 10 is preferably threadedly connected to the vent outlet 34 by a connector pipe 102. The vent check valve 10 is a cylindrical member which generally includes upper and lower portions 104 and 106, respectively, that are threaded together. The upper and lower portions, 104 and 106, include centrally located, cylindrically shaped recesses therein to form an internal floatation chamber 108. The bottom of the lower portion 106 includes a lower passage 110 which extends from the bottom of the vent check valve 10 upwardly to the floatation chamber 108. Additionally, a side passage 112 extends from the intersection of the bottom of the floatation chamber 108 and the top of the lower passage 110 to a pressure gauge 114. As shown best in FIG. 3, this intersection of the floatation chamber 108 and the passages 110 and 112 forms an air flow bypass 126, the function of which is described more fully below. The pressure gauge 114 is threadedly connected to the side of the vent check valve 10 to provide a visual indication of the pressure in the lower passage 110 of the vent check valve 10.

The upper portion 104 of the vent check valve 10 includes an upper passage 116 which extends from the top of the floatation chamber 108 to the top of the vent check valve 10. The top of the vent check valve 10 includes a filter or porous member 118 which is preferably formed of a porous thermoplastic such as Porex brand porous mufflers manufactured by PIAB USA Inc. of Hingham, MA, U.S.A. The porous member 118 may be formed as a screen, filter or other type of member which is preferably threaded onto the top of the upper passage 1116 to allow air to flow freely therethrough while preventing direct access into the vent check valve 10 by contaminants or insects.

The floatation chamber 108 of the vent check valve 10 includes a floatation member 120 which is preferably a hollow stainless steel ball or a nonreactive thermoplastic ball which may or may not be hollow. The floatation member 120 preferably has an overall density less than that of the odorant 18 or other fluid such as a chemical rust inhibitor so that if the odorant 18 or other fluid enters the floatation chamber 108, the floatation member 120 will float therein. Various other shapes such as conical, T-shaped, disc-shaped or U-shaped members may be used as long as the floatation member 120 rises in the liquid in the floatation chamber 108 and forms a seal in the sealing area. As shown in FIGS. 2-6, the floatation chamber 108 preferably has a diameter which is slightly greater than the diameter of the floatation member 120. Additionally, the top portion of the floatation chamber 108 is stepped inwardly and includes a sealing area 122 which tapers inwardly at an approximate angle of about 45 degrees from the main portion of the floatation chamber 108 to the top portion of the floatation chamber 108 which is adjacent to the upper passage 116. The sealing area 122 preferably includes an elastomeric O-ring 124 therein, although metal, plastic or other materials may also be used during the operation of the vent check valve 10 to form the seal between the floatation member 120 and the sealing area 122, depending on the types of liquids encountered. For example, if thiophene (tetrahydrothiophene) is used as an odorant, the O-ring 124 would preferably be formed from Kalrez, a DuPont trademark for an elastomer which resists attack by thiophene.

Figure 3:
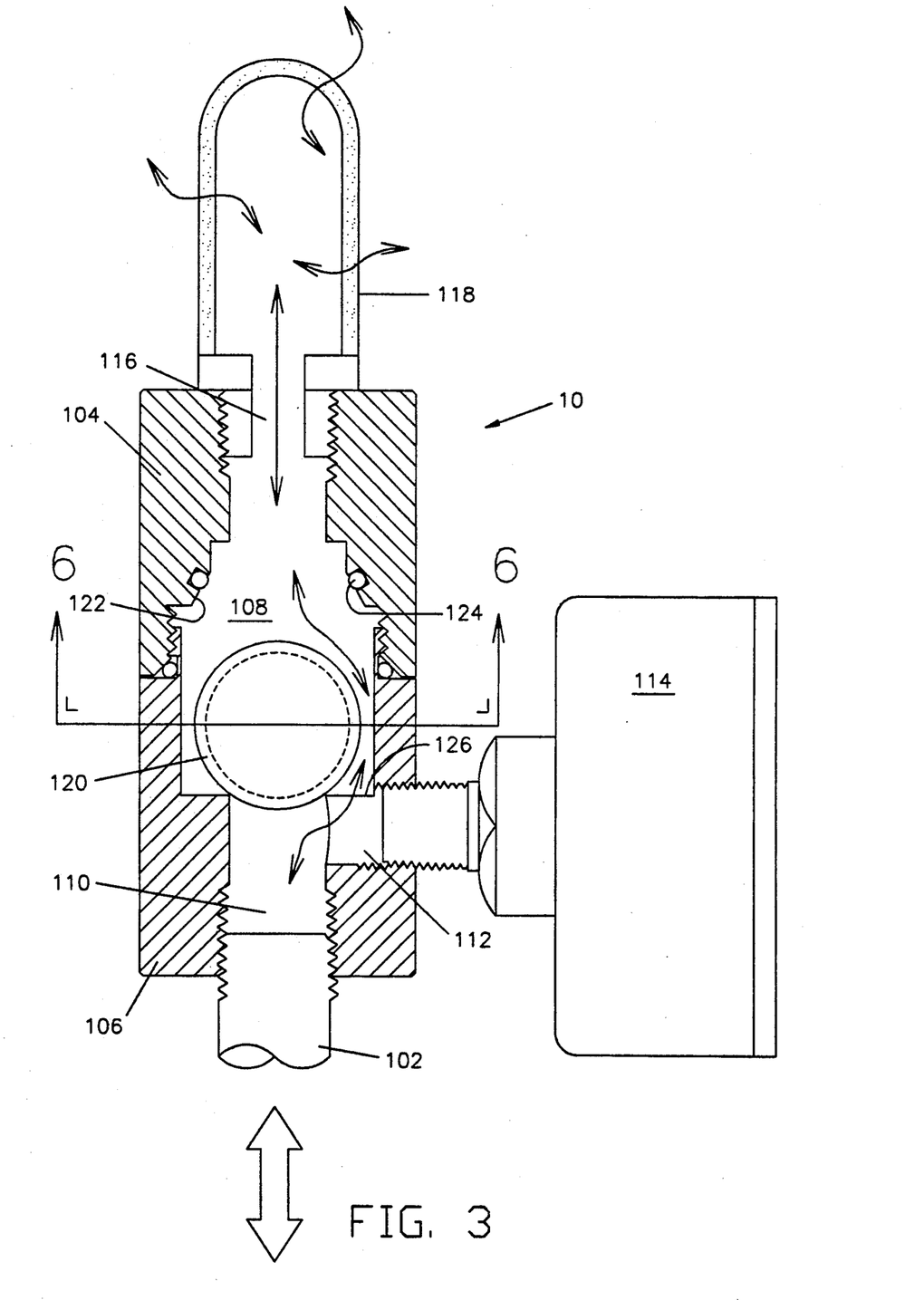
FIG. 3 is an enlarged cross-sectional view of the vent check valve of the present invention diagrammatically showing the flow of air therethrough.

As shown diagrammatically in FIG. 3, during normal operation of the chemical pump 22, air will flow through vent outlet 34 of the chemical pump 22, through the connector pipe 102 and into the vent check valve 10 as the piston and shaft members, 88 and 90, respectively, are moved downwardly in the piston and fluid chambers, 92 and 76, respectively. The air enters the vent check valve 10 through the lower passage 110 and flows around the floatation member 108 via the air flow bypass 126 which is formed by the intersection of the side passage 112 and the lower passage 110 and floatation chamber 108. The air then flows upwardly in the floatation chamber 108, through the upper passage 116 and out of the vent check valve 10 through the pores of the porous member 118.

When the spring 94 of the properly operating chemical pump 22 forces the piston 88 and shaft member upwardly in the piston and fluid chambers, 92 and 76, respectively, the air is drawn inwardly from the vent check valve 10. Initially, the air is drawn through the pores of the porous member 118 and into the upper passage 116 of the vent check valve 10. The air then flows through the floatation chamber 108 around the floatation member 122 and into the air flow bypass 126.

The air then flows from the air flow bypass 126 and out of the bottom of the vent check valve 10 through the lower passage 110. From the vent check valve 10, the air flows through the connector pipe 102 and vent outlet 34 and into the piston chamber 92 of the chemical pump 22.

Figure 4:
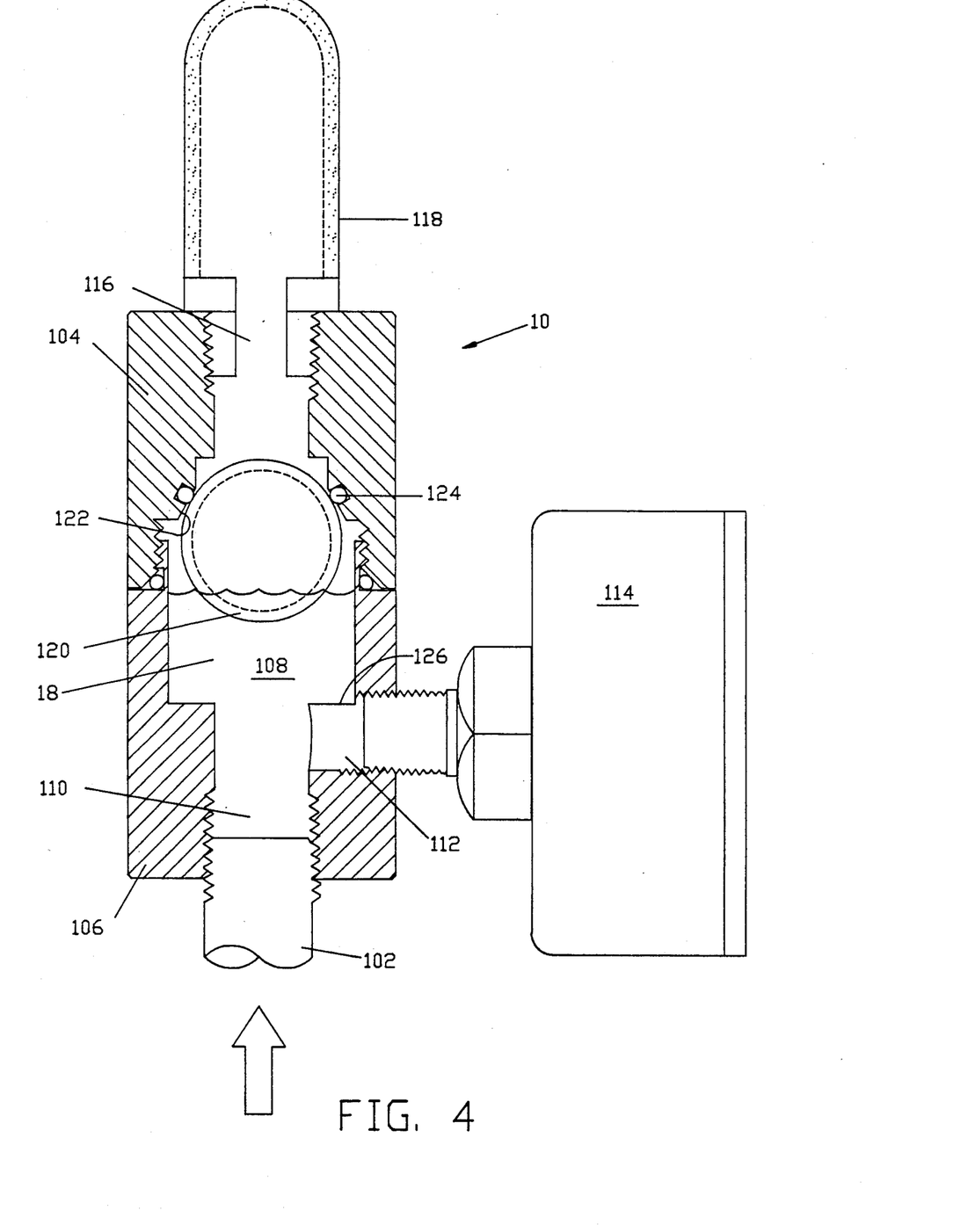
FIG. 4 is an enlarged cross-sectional view of the vent check valve of the present invention diagrammatically showing the flow of odorant or other fluid therein.
Figure 5:
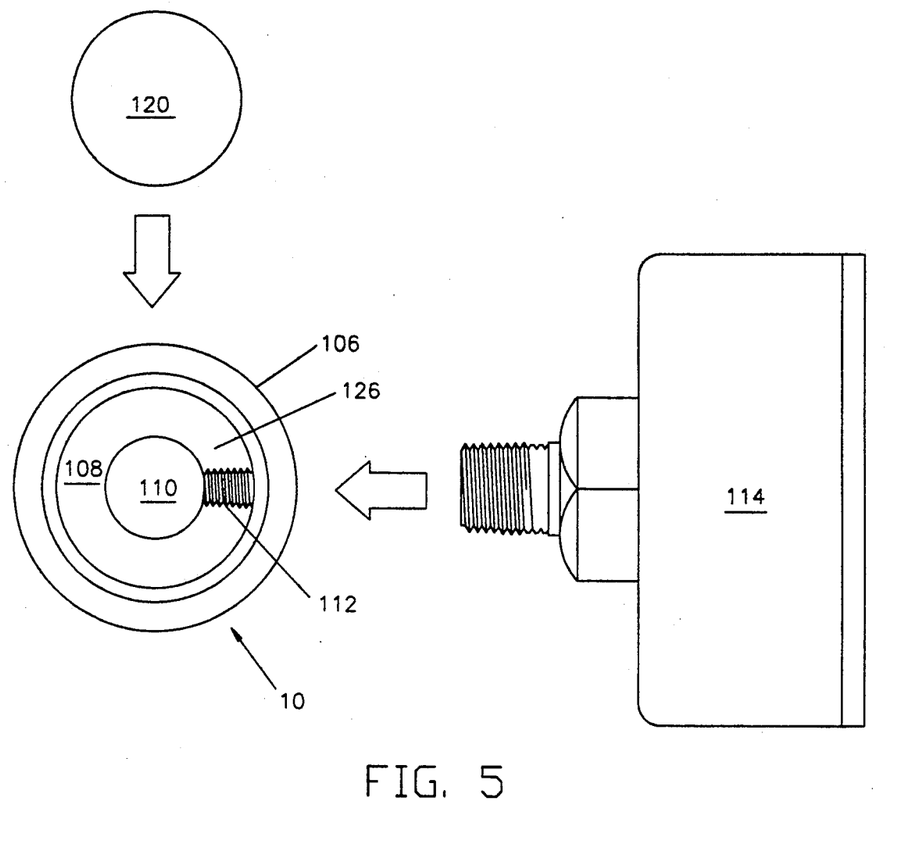
FIG. 5 is an exploded view of the bottom portion of the vent check valve, ball and pressure gauge of the present invention.
Figure 6:
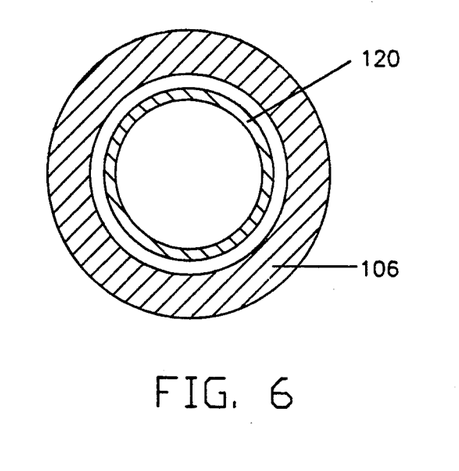
FIG. 6 is a cross-sectional view of the vent check valve of the present invention taken generally along lines 6—6 of FIG. 3.

As shown best in FIG. 4, when the 0-rings 95, 97 and 98 on the cup member 99 in the chemical pump 22 fail, the odorant 18 or other fluid flows into the piston chamber 92 and is pumped through the vent outlet 34 and connector pipe 102 into the vent check valve 10. The odorant 18 or other liquid enters the vent check valve 10 through the lower passage 110 and flows upwardly into the floatation chamber 108. The level of odorant 18 or other liquid rises in the floatation chamber 108 in response to each stroke of the chemical pump 22 and the floatation member 120 rises in the floatation chamber 108 in response to the level of the odorant 18 or other liquid. As this occurs, the floatation member 120 moves from the initial rest position as shown in FIG. 3 to a closed position as shown in FIG. 4. When the floatation member 120 reaches the closed position, the upper portion of the floatation member 120 contacts and preferably compresses the O-ring 124 in the sealing area 122 of the floatation chamber 108. The odorant 18 or other liquid in the floatation chamber 108 creates an upwardly directed pressure on the floatation member 120 to maintain the seal between the flotation member 120 and the sealing area 122 of the floatation chamber 108. In some situations, the chemical pump 22 may be pumping a liquid chemical rust inhibitor instead of the odorant 18. In some circumstances, the liquid chemical rust inhibitor may contain hydrochloric acid or another chlorinated liquid, in which case it would be desirable to form a metal-to-metal seal between the floatation member 120 and the sealing area 122. With other liquids it may be desirable to form a plastic-to-plastic seal between the floatation member 12 and the sealing area 122. As the chemical pump 22 continues to operate, the pressure of the odorant 18 in the vent check valve 10 increases. This increase in pressure is monitored and reflected by the needle on the pressure gauge 114 so that the user will be able to visually observe that the pressure in the vent check valve 10 is increased thereby indicating that one or more of the seals in the chemical pump 22 have malfunctioned. Alternately, the pressure gauge 114 may include or be replaced with an alarm member (not shown) which will signal when the pressure in the vent check valve rises to a certain level to provide an audible or visual signal that the seals of the chemical pump 22 have malfunctioned and that odorant 18 is not being properly injected into the pipe 20.

The foregoing represents a detailed description of the currently preferred form of the present invention and the currently preferred use of the present invention. It is intended that the foregoing represent one preferred example and use of the present invention with the following claims defining the actual scope of the present invention.

I claim:

1. A vent check valve in fluid communication with the vent port of a pump comprising:
   a. a body including inlet and outlet ports and a floatation chamber therein having upper and lower portions, said inlet port of said body being in communication with the vent port of the pump and said vent check valve being oriented to allow air from the pump to pass in and out of said vent check valve when said vent check valve is in an open position during normal operation of the pump;
   b. a valve seat positioned in said upper portion of said flotation chamber;
   c. a rest positioned below said valve seat in said flotation chamber;
   d. a valve element freely movable in said floatation chamber from said rest to said valve seat in said flotation chamber, said valve element being able to float in a liquid from the pump to a closed position of said vent check valve wherein air and fluid are prevented from passing through said outlet port from said vent check valve; and
   e. said valve element contacting said rest when said vent check valve is in an open position and said valve element rising in the flotation chamber when it is flooded with the liquid from the pump in response to a malfunction of the pump and said valve element sealing against said valve seat when said vent check valve is in the closed position.

2. The apparatus of claim 1 wherein said vent check valve is responsive to the flow of an odorant from the pump therein such that during normal operation of the odorant pump said vent check valve to remain in an open position and a malfunction of the odorant pump causes said vent check valve to move to the closed position.

3. The apparatus of claim 2 wherein said valve element is a ball-shaped member which is formed of a material that is substantially non-reactive to the odorant from the odorant pump.

4. The apparatus of claim 3 wherein said valve seat is a metallic lip sized and arranged to seal against said ball-shaped member.

5. The apparatus of claim 3 wherein said valve seat is an elastomeric O-ring arranged to seal against said ball-shaped member.

6. The apparatus of claim 5 wherein said rest is a circular rim above said inlet port generally adjacent said lower portion of said floatation chamber.

7. The apparatus of claim 5 further including a slot in said rim, said slot being open to air flow when said check valve is in the open position.

8. The apparatus of claim 1 wherein said valve element is a hollow stainless steel ball.

9. The apparatus of claim 1 further including a porous member in fluid communication with said outlet port of said vent check valve, said porous member being permeable to gas.

10. The apparatus of claim 9 wherein said porous member is formed of a porous thermoplastic material having a predetermined porosity.

11. The apparatus of claim 1 including a pressure gauge in fluid communication with said flotation chamber to sense pressure in said floatation chamber when the pump malfunctions.

12. A vent check valve dimensioned to be connected to the vent port of an odorant pump comprising:
   a. a body defining a vertically aligned cylindrical flotation chamber having upper and lower portions and said body further including inlet and outlet ports thereon, said inlet port being oriented to be in fluid communication with the vent port of the odorant pump wherein said vent check valve allows air from the odorant pump to pass in and out of said vent check valve when said vent check valve is in an open position during normal operation of the odorant pump;

b. a hollow metallic ball-shaped member being freely movable in said flotation chamber and able to float in the odorant between open and closed positions of said vent check valve;

c. an O-ring mounted in said upper portion of said flotation chamber, said O-ring forming a valve seat to seal against said hollow metallic ball;

d. a rim positioned in said bottom portion of said flotation chamber;

e. said ball-shaped member resting on said rim when said vent check valve is in an open position and said ball-shaped member rising in the flotation chamber when said flotation chamber is flooded with liquid odorant due to a malfunction of the odorant pump to a closed position wherein said ball-shaped member seals against said 0-ring in said upper portion of said flotation chamber to prevent the flow of odorant through said inlet port;

f. a porous member in operative communication with said outlet port to prevent the entry of contaminants into said flotation chamber; and g. a pressure gauge in operative communication with said flotation chamber to indicate the pressure in said flotation chamber.

13. An odorant injection system comprising:

a. an odorant storage container for retaining a supply of liquid odorant therein;

b. a pump in flow communication with said storage container, said pump including a fluid chamber and piston chamber therein with an odorant inlet and odorant outlet in flow communication with said fluid chamber and a pressure inlet and vent outlet in flow communication with said piston chamber;

c. a vent check valve in flow communication with said vent outlet wherein said vent check valve includes a floatation chamber having a floatation member therein, said floatation member being movable between an open position wherein air is allowed to flow freely through said vent check valve and a closed position wherein the flow of air and odorant therefrom is prevented;

d. a nozzle member in flow communication with said odorant outlet to inject, the odorant into a gas flowing through a pipeline; and e. said check valve includes a porous member thereon which allows air to flow therethrough while preventing the entry of contaminants into said flotation chamber.

14. The system of claim 13 wherein said floatation chamber includes upper and lower portions and said lower portion forms a seat for the floatation member to rest thereon when said floatation member is in said open position and said upper portion of said floatation chamber includes an inwardly angled sealing area therein which sealingly receives said floatation member thereagainst when said floatation member is in said closed position.

15. The system of claim 14 wherein said vent check valve includes a side opening therein in flow communication with said lower portion of said floatation chamber.

16. The system of claim 15 wherein said side opening includes a pressure gauge thereon to indicate the pressure in said lower portion of said floatation chamber when said floatation member is in said closed position.

17. The system of claim 13 wherein said floatation member floats in the odorant which is received in said vent check valve from said pump and said floatation member is movable from said open position to said closed position in response to the level of odorant in said floatation chamber.

18. A vent check valve comprising:

a. a generally elongate and cylindrical body member formed of upper and lower portions;

b. a floatation chamber extending vertically in said body member wherein said floatation chamber includes upper and lower portions;

c. an inlet opening in said lower portion of said body wherein said inlet opening is aligned with said lower portion of said floatation chamber to form a lower passage therebetween;

d. an outlet opening in said upper portion of said body wherein said outlet opening is aligned with said upper portion of said floatation chamber to form an upper passage therebetween;

e. a side opening in a side of said lower portion of said body wherein said side opening is aligned with the intersection of said lower passage and said lower portion of said floatation chamber to form a side passage and air flow bypass therebetween;

f. a floatation member movably positioned in said floatation chamber wherein said floatation member is movable between an open position whereby air is allowed to flow through said vent check valve and a closed position whereby the flow of air or fluid from said upper passage is prevented, said floatation member being sized to rest on a ledge formed in said lower position of said floatation chamber by the intersection of said lower passage and said side passage with said floatation chamber in said open position and said floatation member being sized to be sealingly received in a sealing area in said upper portion of said floatation chamber when said floatation member is in said closed position; and g. said sealing area being formed of inwardly tapering side walls in said floatation chamber and including at least one O-ring which sealingly contacts said floatation member when said floatation member is in said closed position to form a fluid-tight seal therebetween to prevent the flow of fluid through said upper passage.

* * * * *